Feb. 8, 1927.
J. AOKI
1,616,944
METHOD OF COOKING CHESTNUTS
Filed June 10, 1926
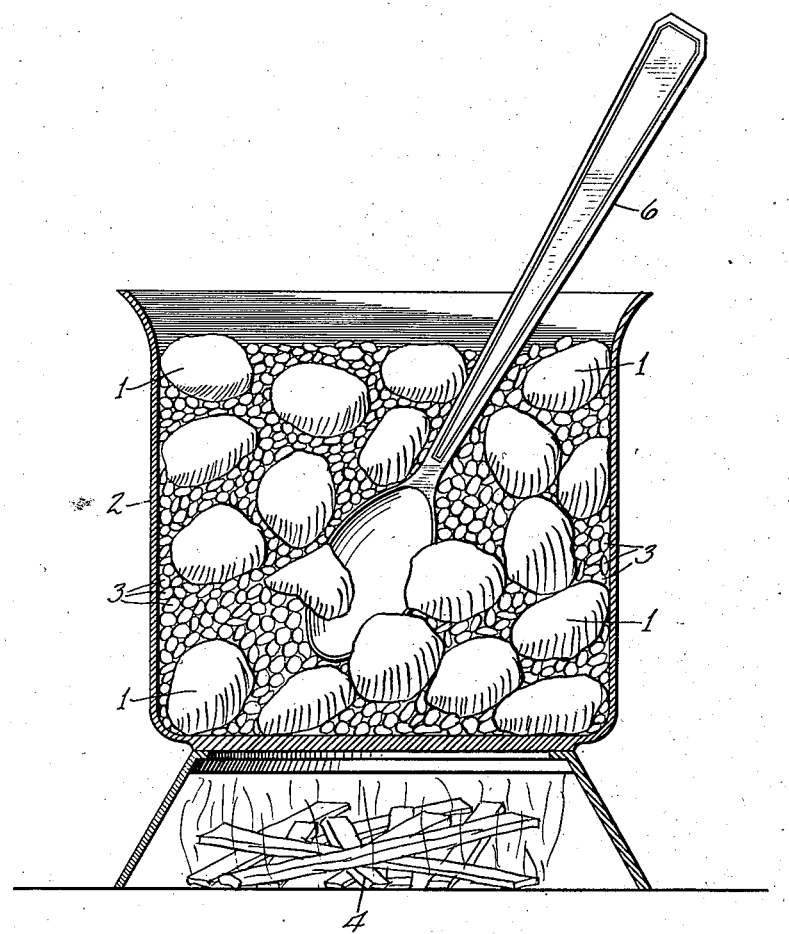
INVENTOR
J. AOKI
BY
Harry C. Schroeder
ATTORNEY Patented Feb. 8, 1927.

1,616,944

UNITED STATES PATENT OFFICE.

JITSUJI AOKI, OF OAKLAND, CALIFORNIA.

METHOD OF COOKING CHESTNUTS.

Application filed June 10, 1926. Serial No. 115,119.

The present invention relates to improvement in a method of cooking chestnuts and has particular reference to a method for uniformly distributing the heat thru a mass of chestnuts placed in a vessel which is heated from the outside in any suitable manner. It is particularly proposed for this purpose to mix a mass of chestnuts to be cooked with a quantity of small bodies of material adapted to absorb heat while under the immediate influence of the heating means and to transmit the heat to the surrounding chestnuts when further removed from the point where the heat is applied. For these small bodies, I preferably use small stones or pebbles, ranging in size from that of rice to that of small beans. These small stones or pebbles fill out the interstices between the chestnuts, absorb heat, and transmit the same to the chestnuts and at the same time serve as a conductor for the heat much more effectively than the air spaces which practically insulate one chestnut from the other.

Further objects and advantages of my invention will appear as the specification proceeds.

The preferred method of carrying out my invention is illustrated in the accompanying drawing which represents a vertical section through a cooking vessel in which chestnuts are cooked in accordance with my method.

I first place a mass of chestnuts 1 in a vessel 2, together with a quantity of small stones 3, ranging in size from that of rice to that of small beans. While the quantity of stones to be mixed may be varied slightly, I prefer to use about three gallons of the small stones to ten pounds of chestnuts. At the beginning of the operation, I preferably also pour half a cup of syrup on the chestnuts. I then apply heat to the vessel in any suitable manner as shown at 4. While the heat is applied, the contents of the vessel are stirred continuously in any suitable manner, by means of a spoon 6 or any other agitator.

The entire cooking process takes about one half an hour to fifty minutes. At intervals, I add more syrup, preferably a second quantity about ten minutes after the starting of the heating operation, and a third quantity about five minutes before the closing of the heating operation.

The stones distributed thru the chestnuts serve to uniformly distribute the heat thruout the mass and result in a superior product.

I claim:

1. The method of cooking chestnuts which comprises placing the chestnuts in a vessel together with a quantity of small stones and agitating the chestnuts and the stones while applying heat to the vessel.

2. The method of cooking chestnuts which comprises placing the chestnuts in a vessel together with a quantity of small stones, ranging in size from that of rice to that of small beans and agitating the chestnuts and the stones while applying heat to the vessel.

3. The method of cooking chestnuts which comprises placing the chestnuts in a vessel together with a quantity of small stones, adding a small quantity of syrup and agitating the contents of the vessel while applying heat thereto.

4. The method defined in claim 3 in which additional amounts of syrup are added during the heating process.

5. The method of uniformly heating a mass of chestnuts which comprises stirring the chestnuts with a quantity of small stones while applying the heat.

6. The method of uniformly heating a mass of chestnuts which comprises stirring the chestnuts with a quantity of small heat absorbing and transmitting bodies while applying the heat.

In testimony whereof I have affixed my signature.

JITSUJI AOKI.